(12) United States Patent
Fu

(10) Patent No.: US 11,409,747 B2
(45) Date of Patent: Aug. 9, 2022

(54) COMBINED FILTERING AND INDEXING FOR READ-ONLY DATA SETS

(71) Applicant: ALIBABA GROUP HOLDING LIMITED, Grand Cayman (KY)

(72) Inventor: Chen Fu, San Mateo, CA (US)

(73) Assignee: ALIBABA GROUP HOLDING LIMITED, George Town (KY)

( * ) Notice: Subject to any disclaimer, the term of this patent is extended or adjusted under 35 U.S.C. 154(b) by 0 days.

(21) Appl. No.: 16/827,306

(22) Filed: Mar. 23, 2020

(65) Prior Publication Data

US 2021/0294807 A1 Sep. 23, 2021

(51) Int. Cl.
*G06F 16/245* (2019.01)
*G06F 16/2455* (2019.01)

(52) U.S. Cl.
CPC .............. *G06F 16/24562* (2019.01)

(58) Field of Classification Search
CPC ................. G06F 16/9027; G06F 16/2228
See application file for complete search history.

(56) References Cited

U.S. PATENT DOCUMENTS

| | | | | |
|---|---|---|---|---|
| 6,035,309 A | * | 3/2000 | Dauerer | G06F 40/18 715/212 |
| 2014/0122921 A1 | * | 5/2014 | Imamichi | G06F 16/2228 714/6.2 |

OTHER PUBLICATIONS

B.H. Bloom "Space/Time Trade-offs in Hash Coding with Allowable Errors," Communications of the ACM, vol. 13, No. 7, pp. 422-426 (1970).
O'Neil et al. "The Log-Structured Merge-Tree (LSM-Tree)," Acta Inf., vol. 33, No. 4, pp. 351-385 (1996).
H. Zhang et al. "SuRF: Practical Range Query Filtering with Fast Succinct Tries" SIGMOD '18 Proceedings of the 2018 International Conference on Management of Data, Houston, TX, pp. 1-14 (2018).
R. Grossi et al. "Fast Compressed Tries Through Path Decompositions," Journal of Experimental Algorithmics (JEA), vol. 19, No. January, pp. 1-13 (2015).
G. Jacobson "Space-efficient Static Trees and Graphs," Proceedings of the 30th Annual Symposium on Foundations of Computer Science, Washington, DC, USA pp. 549-554 (1989).

(Continued)

*Primary Examiner* — Baoquoc N To
(74) *Attorney, Agent, or Firm* — Finnegan, Henderson, Farabow, Garrett & Dunner, LLP

(57) ABSTRACT

The present disclosure provides a method for executing a query in a database, the method comprising receiving the query that comprises a query key; searching a data structure of the database to determine whether the query key includes a portion that corresponds to an entry in the database, wherein the data structure comprises a first sequence of values comprising information that indicates whether the database comprises data that corresponds to a portion of a key, and a second sequence of values comprising pointers pointing to data that corresponds to the key; in response to the query key including a portion that corresponds to an entry in the database, determining a location of a value in the first sequence, wherein the value corresponds to the portion of the query key; and determining a pointer in the second sequence of values according to the location, wherein the pointer points to data that corresponds to the query key.

19 Claims, 13 Drawing Sheets

(56) References Cited

OTHER PUBLICATIONS

Redis Labs "Basic Rate Limiting" https://redislabs.com/redis-best-practices/basic-rate-limiting/ pp. 1-3 (2020).
F.Chang et al. "Bigtable: A Distributed Storage System for Structured Data," 7$^{th}$ USENIX Symposium on Operating Systems Design and Implementation (OSDI 06), Seattle, WA. pp. 1-14 (2006).
S. Dong "Plain Table-A New File Format," https://rocksdb.org/blog/2014/06/23/plaintable-a-new-file-format.html, Facebook,_Jun. 23, 2014.
Jen-Wei Hsieh et al. "Efficient Identification of Hot Data for Flash Memory Storage Systems," ACM Transaction on Storage, vol. 2, pp. 22-40 (2006).
Levandoski et al. "Identifying Hot and Cold in Main-memory Databases," Proceedings of the 2013 IFFF International Conference on Data Engineering (ICDE 2013), Washington, DC, USA_pp. 1-12 (2013).
Dongchul Park et al. "Hot Data Identification with Multiple Bloom Filters: Block-Level vs I/O Request-Level Decision," Journal of Computer Science and Technology, 33(1): pp. 79-97 (2018).
Timo Bingmann "STX B+ Tree C ++ Template Classes," http://panthema.net/2007/stx-btree/, May 5, 2013.

* cited by examiner

```
public static class LoudsIteration {
        boolean valid = false;
        int length = 0;
        int[] positions = new int[max_tre_height];
        boolean is_at_terminator = false;
}
```

FIG. 3

```
public LoudsIteration query (byte[] key) {
        LoudsIteration iter = new LoudsIteration ();

int nodePosition = 0;

int level;
        for (level = 0; level < key.length; level++) {
                int labelPosition = Search (nodePosition, key[level]);
                if (labelPosition is invalid) {
                        //no match, return an invalid iterator with a partial path/prefix
                        return iter;
                } iter.positions[iter.len] = labelPosition;
                iter.length++;
                if (!hasChild[labelPosition]) {
                        //trie branch terminates, so we found a prefix of the search key
                        iter.is_at_terminator = false;
                        iter.valid = true;
                        return iter;
                }

//move to child
                nodePosition = ChildPos (labelPosition);
        } if ((labels[nodePosition] == 0xFF) && NodeSize(nodePosition) > 1) {
                //perfect match!
                iter.positions[iter_len] = nodePosition;
                iter.length++;
                iter_is_at_terminator = true;
                iter_is_valid = true;
        }

// when no match, iter points to an internal node
        return iter;
}
```

FIG. 4

```
public BlockPointer findBlock (LoudsIteration iter) { if (BP[iter.positions[iter.length]] == 1){
        // the key itself points to a light grey value node
        return BlockPointer (iter.positions[iter.length]);
    }

// locate a first edge that is not light grey
    int frontier = smallest i where BF[iter.positions[i]] == 0;

for (;;) {
        int pos = iter.positions[frontier];
        int smallerLightGreyPos = largest i where i < pos && BF[i] == 1;
        if (smallerLightGreyPos in the same node as pos) {
            // we found a smaller light grey sibling
            iter.positions[frontier] = smallerLightGreyPos;
            break;
        }

// no smaller light grey sibling found, back track
        frontier--;
    }

// move to the right most light grey child
    while (hasChild[iter.positions[frontier]] == 1){
        //move to child
        int childNode = ChildPos(iter.positions[frontier]);
        int largestLightGreyPos = largest i in childNode that BF[i] == 1;
        frontier++;
        iter.positions[frontier] = largestLightGreyPos;
    } return BlockPointer(iter.positions[frontier]);
}
```

FIG. 13

COMBINED FILTERING AND INDEXING FOR READ-ONLY DATA SETS

BACKGROUND

In data storage systems, filters and indexes can be crucial to help databases to speed up query executions. Usually, a data run can be organized as a tree to facilitate efficient data query, at a cost of extra storage for storing indexes. Since filters and indexes are more likely to be kept in high cost storage media, there is a strong incentive to drive down the size of index data structures. Moreover, both the filter and index can cost extra memory for higher query performance.

SUMMARY

Embodiments of the present disclosure provide a method for executing a query in a database, the method comprising receiving the query that comprises a query key; searching a data structure of the database to determine whether the query key includes a portion that corresponds to an entry in the database, wherein the data structure comprises a first sequence of values comprising information that indicates whether the database comprises data that corresponds to a portion of a key, and a second sequence of values comprising pointers pointing to data that corresponds to the key; in response to the query key including a portion that corresponds to an entry in the database, determining a location of a value in the first sequence, wherein the value corresponds to the portion of the query key; and determining a pointer in the second sequence of values according to the location, wherein the pointer points to data that corresponds to the query key.

Embodiments of the present disclosure further provides a data storage system for executing a query in a database, the data storage system comprising a memory storing a set of instructions; and a processor configured to execute the set of instructions to cause the data storage system to perform the following: receiving the query that comprises a query key; searching a data structure of the database to determine whether the query key includes a portion that corresponds to an entry in the database, wherein the data structure comprises a first sequence of values comprising information that indicates whether the database comprises data that corresponds to a portion of a key, and a second sequence of values comprising pointers pointing to data that corresponds to the key; in response to the query key including a portion that corresponds to an entry in the database, determining a location of a value in the first sequence, wherein the value corresponds to the portion of the query key; and determining a pointer in the second sequence of values according to the location, wherein the pointer points to data that corresponds to the query key.

Embodiments of the present disclosure also provide a non-transitory computer readable medium that stores a set of instructions that are executable by one or more processors of an apparatus to perform a method for executing a query in a database, the method comprising receiving the query that comprises a query key; searching a data structure of the database to determine whether the query key includes a portion that corresponds to an entry in the database, wherein the data structure comprises a first sequence of values comprising information that indicates whether the database comprises data that corresponds to a portion of a key, and a second sequence of values comprising pointers pointing to data that corresponds to the key; in response to the query key including a portion that corresponds to an entry in the database, determining a location of a value in the first sequence, wherein the value corresponds to the portion of the query key; and determining a pointer in the second sequence of values according to the location, wherein the pointer points to data that corresponds to the query key.

BRIEF DESCRIPTION OF THE DRAWINGS

Embodiments and various aspects of the present disclosure are illustrated in the following detailed description and the accompanying figures. Various features shown in the figures are not drawn to scale.

FIG. 3 illustrates an example pseudocode defining a data structure "LoudsIteration."

FIG. 4 illustrates an example pseudocode for querying a key in a trie using a data structure "LoudsIteration."

FIG. 13 illustrates an example pseudocode for querying a key in a succinct trie structure supporting a block index, according to some embodiments of the present disclosure.

DETAILED DESCRIPTION

The following description refers to the accompanying drawings in which the same numbers in different drawings represent the same or similar elements unless otherwise represented. The implementations set forth in the following description of example embodiments do not represent all implementations consistent with the disclosure. Instead, they are merely examples of apparatuses and methods consistent with aspects related to the disclosure as recited in the appended claims.

In data storage systems, log structured merge trees structure ("LSM Tree Structure") is one of the de facto standards for data storage. In an LSM Tree Structure, data can be organized into multiple sorted runs. New updates on the data can be sorted as they enter an in-memory write buffer. Content in the buffer can be written to storage disks when the buffer becomes full, forming a new sorted run. Multiple new sorted runs can be merged periodically in order to keep the number of sorted runs under control.

A system that incorporates the LSM Tree Structure usually support three operations: put, get, and scan. The put operation can take as input a key and a value, and update data record associated with the given key using the value. The get operation can take as input a key and read a data record associated with the given key. The scan operation can take as input a start value and an end value and read all records that have keys in the range between the start value and the end value.

Figure 1:
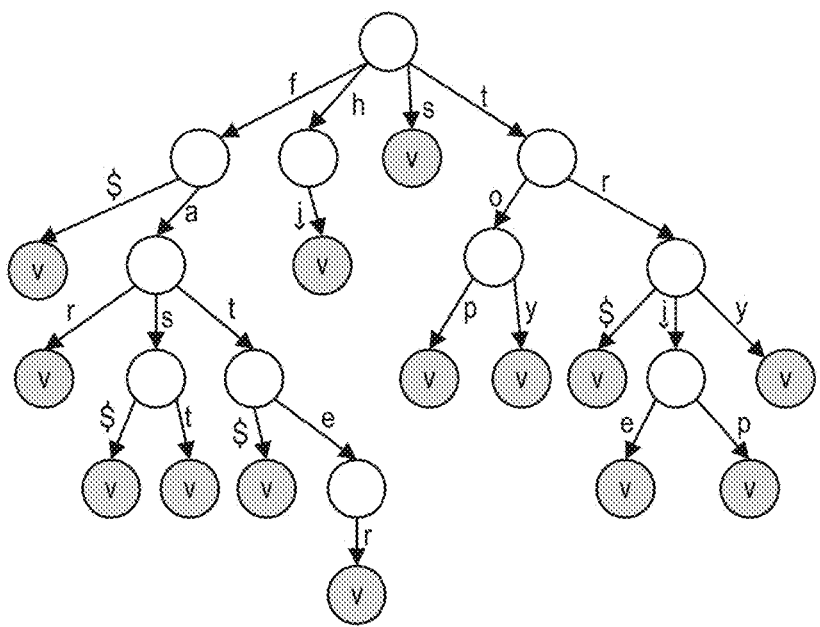
FIG. 1 illustrates a schematic diagram of an example succinct trie data structure.

Some of the systems incorporating the LSM Tree Structure use a succinct trie data structure to improve memory efficiency. FIG. 1 illustrates a schematic diagram of an example succinct trie data structure. As shown in FIG. 1, the succinct trie data structure comprises trie, which is an ordered tree data structure where keys can be strings. The table of FIG. 1 shows contents of a sorted map, and the right-hand side of FIG. 1 shows how the contents are stored in a trie map.

All descendants of a node can have a common portion of the string, which is represented by the path from the root to that node. In other words, a prefix of the strings can be the same. For example, as shown in FIG. 1, key "far" and "fas" are descendants of a node whose path from the top reads keys "f" and "a" in order. All labels are shown as letters for illustration purposes only. It is appreciated that the labels can be any byte values. It is appreciated that a prefix of a string can also be the whole string itself. For example, a prefix for key "far" can also be "far."

To retrieve a value associated with a specific string key, a get operation can be performed starting from the root node, and following a pointer labeled by each element of the string key. For example, to retrieve a value associated with a string key "fast," the get operation can start from the root node and follow the label "f" to reach the left most node on the second level of the tree. Then, the get operation can follow the next label "a" to reach the left most node on the third level. The get operation continues to follow two more labels "s" and "t" to reach the node that represents the value associated with the key "fast."

As shown in the example above, the path from the root node to the node that represents the value comprises a common prefix shared by all descendants. In some cases, a key's prefix can also be a key itself. For example, as shown in FIG. 1, prefix "fas" can also be a key. As a result, a special label (e.g., "$") can be used to show that a prefix can also be a valid key, and the pointer labeled by the special label points to a value that is associated with the prefix.

Traditional node-and-pointer implementation of the trie data structure is still not memory efficient, since the pointers can take up a lot of space in memory. A form of succinct trie can reduce memory footprint by avoiding using pointers. The succinct trie can use a Level-Ordered Unary Degree Sequence ("LOUDS") to encode the tree. In a LOUDS structure, nodes can be laid out in a breadth-first order, and each node's degree is encoded using the unary code.

Figure 2:
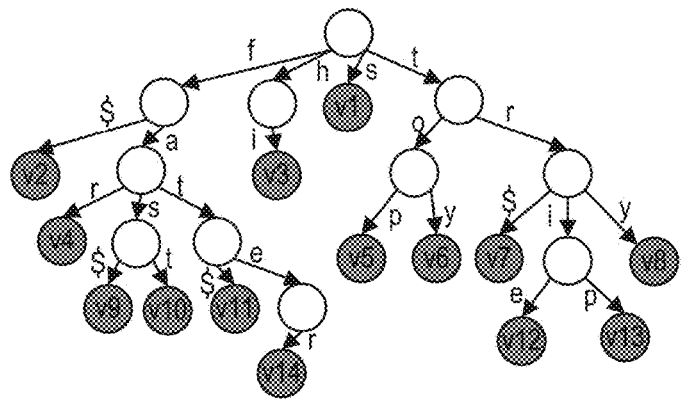
FIG. 2 illustrates a schematic diagram of an example succinct trie data structure using LOUDS structure.

FIG. 2 illustrates a schematic diagram of an example succinct trie data structure using LOUDS structure. The top portion of the succinct trie data structure in FIG. 2 shows a traditional trie map, and the bottom portion of FIG. 2 shows the LOUDS encoding of the trie map. As shown in FIG. 2, the LOUDS encoding comprises four sequences, namely "labels," "hasChild," "louds," and "values."

The "labels" sequence is a byte sequence that records all the branching labels. For example, as shown in FIG. 2, the root node has 4 labels "f," "h," "s," and "t." The next nodes based on the breadth-first search sequence has two labels—"$" and "a." In some implementations, label "$" can be a byte value 0xFF, and label "$" can always be located at the beginning of each node. As the labels in a node are sorted in ascending order, the beginning of each node can be distinguished by locating each label "$." It is appreciated that label "$" may not appear in a single label node.

The "hasChild" sequence is a bit sequence that includes one bit for each byte in the "labels" sequence. Each entry in the "hasChild" sequence indicates whether the corresponding label has a child branch. For example, as shown in FIG. 2, label "s" under the root node has no further branches. As a result, the corresponding entry in the sequence "hasChild" comprises a value "0."

The "louds" sequence is a bit sequence that includes one bit for each byte in the "labels" sequence. The "louds" sequence indicates boundaries of each node. If a label is the first in a node, its "louds" bit is set to 1. For example, as shown in FIG. 2, the root node has 4 labels, indicated by the first "1000" in the "louds" sequence. The first label under the root node is "f," which has a "louds" value of 1. The rest of the labels under the root node are "h," "s," and "t," and these labels each have a "louds" value of 0. The second node is the one pointed by the label "f" in the root node, which has two labels "$" and "a." As a result, the "louds" sequence right after the root node reads "10." The third node is the one pointed by the label "h" in the root node, which has only one label "i." As a result. The "louds" value for label "i" is 1.

The "values" sequence can store values that correspond to each byte in the "labels" sequence. In some implementations, each entry in the "values" sequence is a fixed-length pointer to a file block (on a secondary storage media) containing a set of data records having keys fall between the keys in the trie. For example, the value associated with label "s" may point to the data block containing records with keys such as "s", "sara", "sophia" (any keys that should be sorted after "s" and before "top").

To query the trie, the "louds" sequence is scanned from the beginning. First, a search operation Search (pos, b) can be used. The search operation takes as input a starting position pos of a node. Since pos position represents a starting position of a node, the value of the "louds" sequence at the pos position, which can be represented as louds[pos], is always 1. The "louds" sequence can then be scanned until a location right before the next value of 1 is reached to obtain all labels in this node. For example, when "pos" is equal to 0, the starting position is the root node. By scanning the "louds" sequence to the next value of 1, 4 labels "f," "h," "s," and "t" can be obtained. Given a label b, the search operation Search (pos, b) can return the position of label "b" in the current node:

$$\text{Search }(pos, b)\text{: return the position of label }b\text{ in starting from }pos. \quad (1)$$

Next, two more operations can be established to help with the query operation. A rank operation $rank_1$, (bitVector, i) can count the number of value "1" up to position i in a given bit vector bitVector. A select operation $select_1$ (bitVector, i) can return the position of the i-th value "1" in a given bit vector bitVector:

$$rank_1 \text{ (bitVector, }i\text{): scan bitVector to return number of is }up\text{ to position }i; \quad (2)$$

$$select_1 \text{ (bitVector, }i\text{): scan bitVector to return position of the }i\text{-th }1. \quad (3)$$

Based on these operations, a position of a child label can be determined using a ChildPos (pos) operation. The ChildPos (pos) operation can be represented as:

$$\text{ChildPos }(pos) = \text{select}_1 \text{ (louds, rank}_1 \text{ (hasChild, }pos\text{)} + 1). \quad (4)$$

For example, to query a key "fast," the query operation starts at the root node where pos=0. Here, the first label to be searched is "f." Using operation Search (0, "f"), it can be determined that the position of the first label "f" is at 1. Then, operation $\text{rank}_1$, (hasChild, 1) is executed to determine if the label "f" has any child labels. In this case, operation $\text{rank}_1$, (hasChild, 1) evaluates to 1, and $\text{select}_1$, (louds, 1+1) evaluates to 4. As a result, the position of the child node represented by label "f" is 4. The next label is "a," and operation ChildPos (Search (4, "a")) can find the position of the child node represented by label "a." Here, the variable pos is updated to "5." This process can repeated until a position is reached where hasChild[pos]=0, indicating that the end of a valid key has been reached.

Once a valid key in the trie has been reached, an operation ValuePos (pos) can be used locate the position of the valid key's associated value in the "values" sequence:

$$\text{ValuePos }(pos) = pos - \text{rank}_1 \text{ (hasChild, }pos\text{)} - 1. \quad (5)$$

For example, as shown in FIG. 2, the position for the key "fast" is at 19. As a result, operation $\text{rank}_1$, (hasChild, 19) is executed to return a result 9, since the number of is up to position 19 in sequence "hasChild" is 9. Operation ValuePos (19)=19–9 can then be executed to return a result 10. Therefore, the 10-th value in the "values" sequence is the value the corresponds to the key "fast." As shown in FIG. 2, the 10-th value in the "values sequence is "V10."

To facilitate the traversing of a trie, a data structure "LoudsIteration" can be defined. A "LoudsIteration" data structure can represent a path in the trie, from the root to the current node, with each element of the positions array representing the position of the label. FIG. 3 illustrates an example pseudocode defining a data structure "LoudsIteration." As shown in FIG. 3, the data structure "LoudsIteration" comprises four variables, namely "valid," "length," "positions," and "is at terminator." The "valid" variable shows whether the path defined in the data structure "LoudsIteration" is valid. The "length" variable shows the length of the path defined in the data structure "LoudsIteration." The "positions" variable shows the locations of labels along the path defined in the data structure "LoudsIteration." The "is at terminator" variable shows whether the path defined in the data structure "LoudsIteration" is a perfect match for the labels.

For example, as shown in FIG. 2, when the query key is "fast," the "LoudsIteration" object should be a valid one (e.g., "valid" variable is equal to "true"). There are four positions: 0, 5, 10, and 18. In the "Labels" sequence shown in FIG. 2, "Labels[0]" is equal to "f," "Labels[5]" is equal to "a," "Labels[10]" is equal to "s," and "Labels[18]" is equal to "f." As a result, the "positions" variable should read as (0, 5, 10, 18).

FIG. 4 illustrates an example pseudocode for querying a key in a trie using a data structure "LoudsIteration." As shown in FIG. 4, function "query" takes as input a key, and outputs a "LoudsIteration" data structure that comprises a path of locations for the key. The function "query" shown in FIG. 4 can update the variables "valid," "length," "positions[ ]," and "is_at_terminator" of a "LoudsIteration" object "iter." The "valid" variable of object "iter" can provide information on whether there is a match. If there is a match, ValuePos (iter.positions[iter.len−1]) can be used to retrieve the value associated with the key from the "values" sequence.

Filters and indexes are critical for read performance in LSM Tree Structures. Filters and indexes can provide an initial assessment of whether a key may exist in a sorted run. For example, in LSM Tree Structures, each sorted run can be equipped with a bloom filter that is used to speed up the get operation. The bloom filter can facilitate the get operation by quickly pointing out whether the given key can be found in the sorted run with a relatively high accuracy. As a result, the system can quickly determine whether a sorted run contains the given key and skip most of the sorted runs that are determined to not contain the given key. Unfortunately, bloom filters do not help with scan operations, and every single sorted run must be queried to serve a scan operation.

Figure 5:
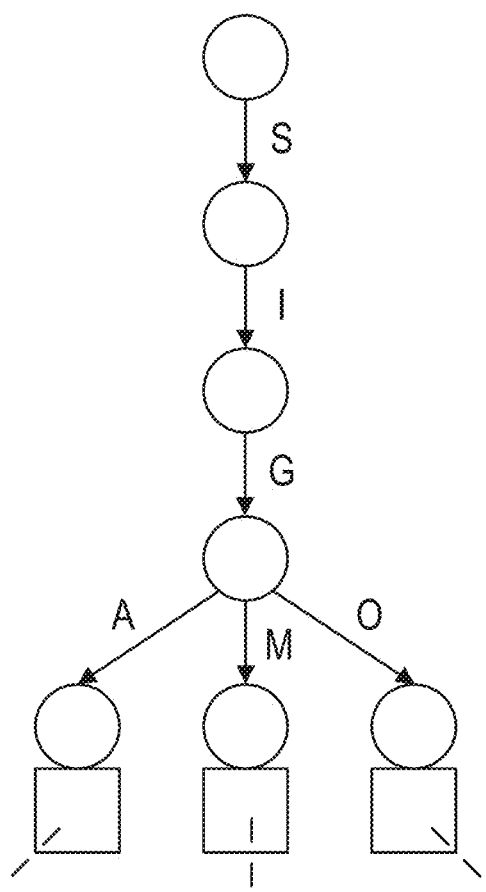
FIG. 5 illustrates an example truncated trie using Succinct Range Filters.

Some of the systems incorporating the LSM Tree Structure use a new filter—Succinct Range Filter ("SuRF"). The SuRF is based on succinct trie data structures (e.g., succinct trie shown in FIG. 2). The SuRF is a compact data structure that inserts keys in a truncated trie. FIG. 5 illustrates an example truncated trie using Succinct Range Filters. As shown in FIG. 5, the truncated trie contains a set of data records that comprises keys "SIGAI," "SIGMOD," and "SIGOPS." The data records share a common prefix "SIG," which can be saved and represented only once in the truncated trie. In addition, the truncated trie may contain a unit memory (e.g., one byte) for each of the next keys "A," "M," and "O," hence truncating the keys beyond the "SIGA," "SIGM," and "SIGO" prefixes. In some embodiments, FIG. 5's truncated trie can be implemented using succinct data structure shown in FIG. 2.

Although the truncated tree is more memory efficient, it can lead to false positives. For example, when a query searches for a key "SIGMETRICS," the truncated tree in the SuRF may still return a positive result, since the prefix "SIGM" exists in the truncated trie. One way to mitigate the false positive issue is to add a hash value of a fixed length (e.g. 8 bits) as the key's associated value in the trie map, As shown in FIG. 5, the hash values for each prefixes "SIGA," "SIGM," and "SIGO" are denoted as squares. In some embodiments, the hash value can be the value in the succinct trie data structure shown in FIG. 2.

The SuRF supports range queries. As a result, SuRF can speed up both get operations and scan operations. This is a step forward over the bloom filters. Unfortunately, both filters and indices cost extra memory for higher query performance. In addition, a sorted run is usually organized as a read only B+ tree to facilitate efficient data query, at a cost of extra storage for storing the indexes. Since indexes are more likely to be kept in high cost memory media such as a dynamic random-access memory ("DRAM"), there exists a strong incentive to drive down the size of the index data structure to drive down memory cost. It is highly desirable to continue improve the memory efficiency of the data structure for cost saving purposes.

Figure 6:
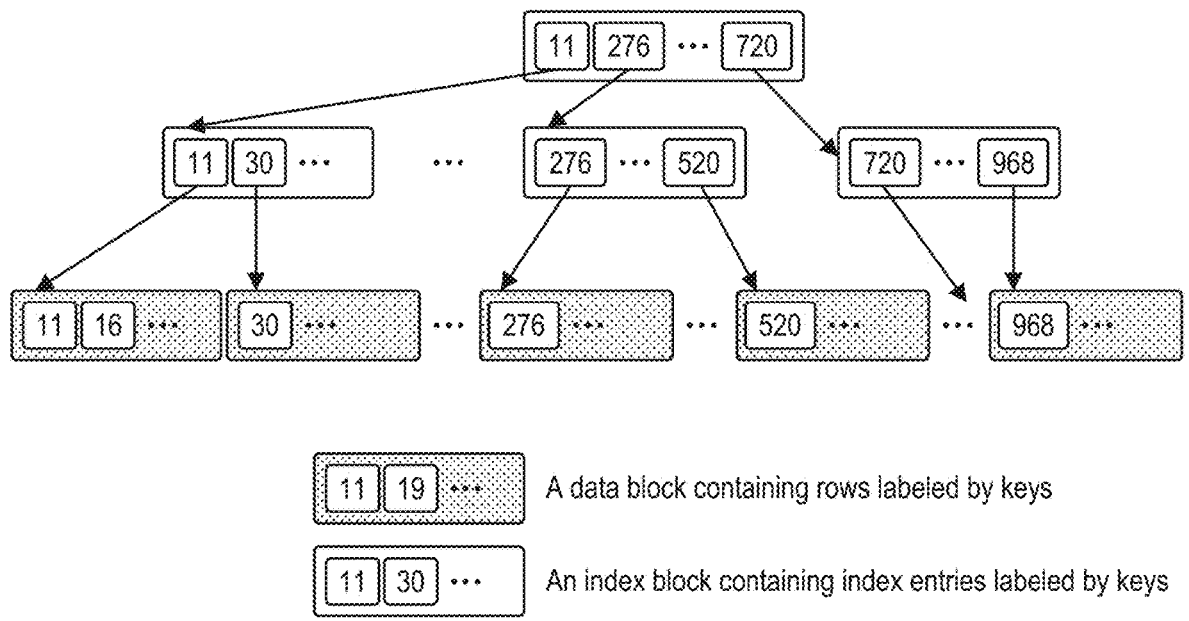
FIG. 6 illustrates an example structure of a B+ tree, according to some embodiments of the present disclosure.

To further improve over the SuRF, indexes can be used to speed up query of a single sorted data run. As mentioned above, a sorted data run is usually organized as a read only B+ tree. FIG. 6 illustrates an example structure of a B+ tree, according to some embodiments of the present disclosure. As shown in FIG. 6, at the bottom of the B+ tree, each data block can contain records sorted by keys. Above the data blocks are one or more levels of index blocks. Each index block has multiple index entries. An index entry can contain a key and a pointer to another block in a lower level, where the key corresponds to the first key in the pointed block. For example, the index block at the top comprises three keys "11," "276," and "720." The key "276" contains a pointer that points to another index block in the second level, and the first key in the index block that key "276" points to is also "276."

Figure 7:
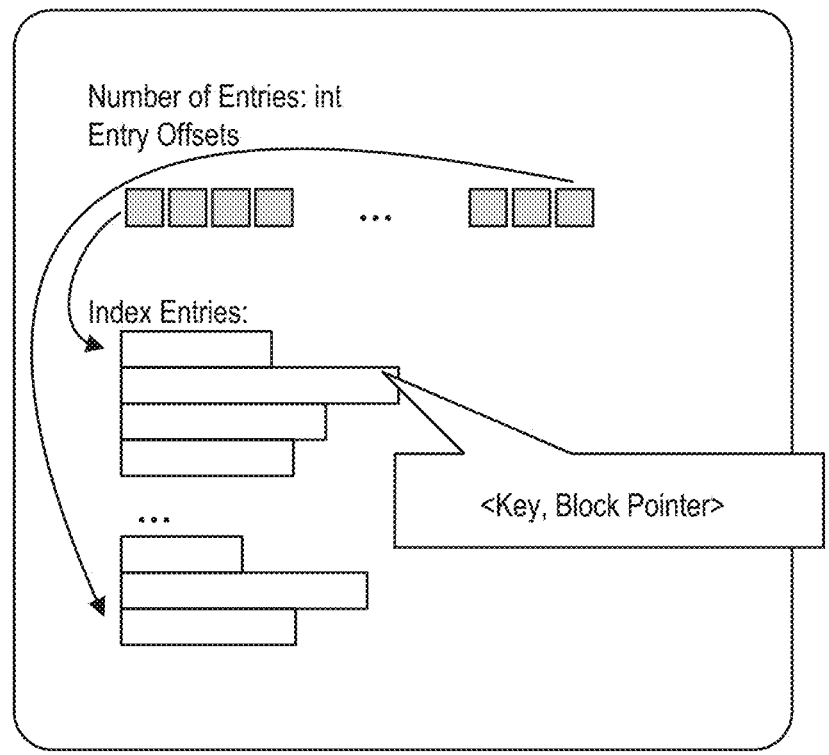
FIG. 7 illustrates an example data structure of an index block in a B+ tree, according to some embodiments of the present disclosure.

FIG. 7 illustrates an example data structure of an index block in a B+ tree, according to some embodiments of the present disclosure. As shown in FIG. 7, the first field can indicate a total number of entries in the block, followed by a list of pointers pointing to the start of each index entry in the block. The pointers in the list can have fixed sizes. As a result, the list of pointers can be used for binary search, since the list of pointers can help the system to quickly locate any entry without sequentially scanning from the very beginning. Following the list of points are index entries, each of which comprises a key and a block pointer.

As shown in FIG. 5, FIG. 6, and FIG. 7, the SuRF already comprises a bulk part of the information for an index: all the keys. If the filter and the index are kept separately, the same information is saved repeatedly, which causes memory inefficiency and wastes memory and query computation.

Figure 8:
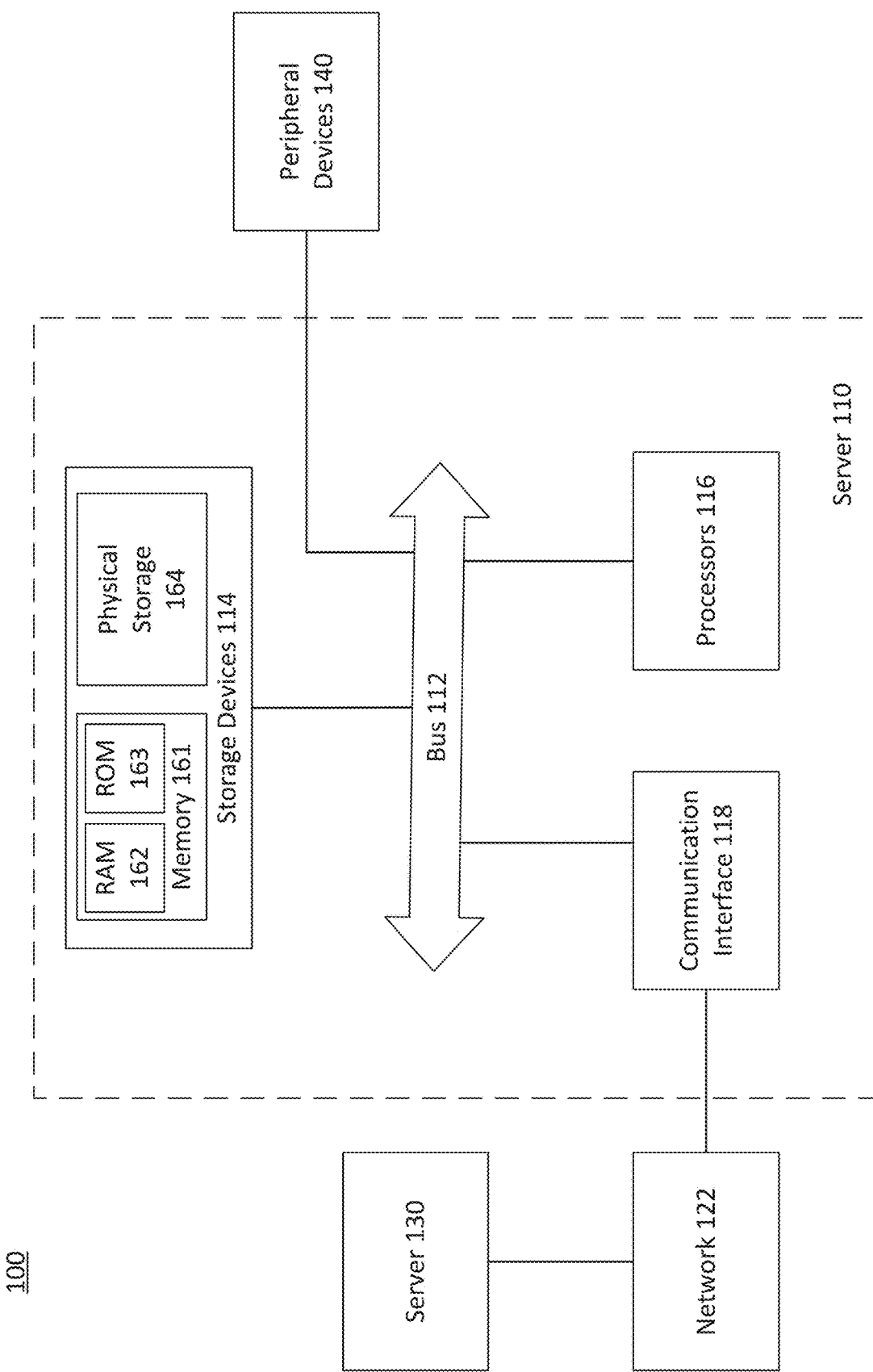
FIG. 8 is a schematic diagram illustrating an example server of a data storage system, according to some embodiments of the present disclosure.

The present disclosure provides an augmented SuRF to building a full index and a block index at the same time. FIG. 8 is a schematic diagram illustrating an example server of a data storage system, according to some embodiments of the present disclosure. According to FIG. 8, server 110 comprises a bus 112 or other communication mechanism for communicating information, and one or more processors 116 communicatively coupled with bus 112 for processing information. Processors 116 can be, for example, one or more microprocessors.

Server 110 can transmit data to or communicate with another server 130 through a network 122. Network 122 can be a local network, an internet service provider, internet, or any combination thereof. Communication interface 118 of server 110 is connected to network 122. In addition, server 110 can be coupled via bus 112 to peripheral devices 140, which comprises displays (e.g., cathode ray tube (CRT), liquid crystal display (LCD), touch screen, etc.) and input devices (e.g., keyboard, mouse, soft keypad, etc.).

Server 110 can be implemented using customized hard-wired logic, one or more ASICs or FPGAs, firmware, or program logic that in combination with the server causes server 110 to be a special-purpose machine.

Server 110 further comprises storage devices 114, which may include memory 161 and physical storage 164 (e.g., hard drive, solid-state drive, etc.). Memory 161 may include random access memory (RAM) 162 and read only memory (ROM) 163. Storage devices 114 can be communicatively coupled with processors 116 via bus 112. Storage devices 114 may include a main memory, which can be used for storing temporary variables or other intermediate information during execution of instructions to be executed by processors 116. Such instructions, after being stored in non-transitory storage media accessible to processors 116, render server 110 into a special-purpose machine that is customized to perform operations specified in the instructions. The term "non-transitory media" as used herein refers to any non-transitory media storing data or instructions that cause a machine to operate in a specific fashion. Such non-transitory media can comprise non-volatile media and/or volatile media. Non-transitory media include, for example, optical or magnetic disks, dynamic memory, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, flash memory, register, cache, any other memory chip or cartridge, and networked versions of the same.

Various forms of media can be involved in carrying one or more sequences of one or more instructions to processors 116 for execution. For example, the instructions can initially be carried out on a magnetic disk or solid-state drive of a remote computer. The remote computer can load the instructions into its dynamic memory and send the instructions over a telephone line using a modem. A modem local to server 110 can receive the data on the telephone line and use an infra-red transmitter to convert the data to an infra-red signal. An infra-red detector can receive the data carried in the infra-red signal and appropriate circuitry can place the data on bus 112. Bus 112 carries the data to the main memory within storage devices 114, from which processors 116 retrieves and executes the instructions.

Figure 9:
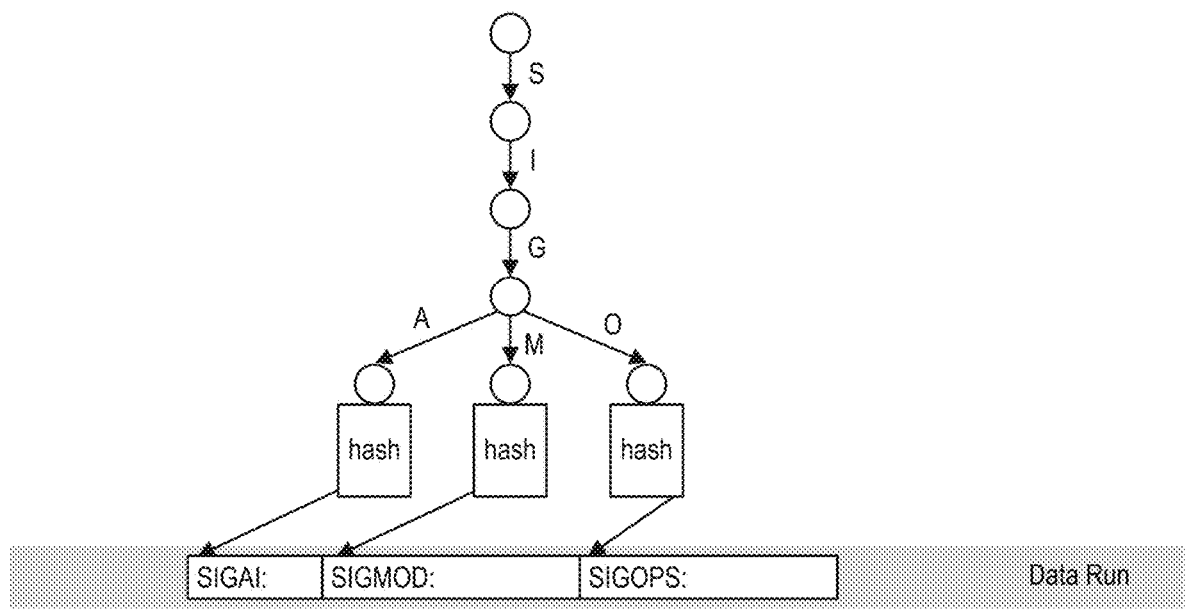
FIG. 9 is a schematic diagram illustrating an example succinct range filter that is augmented to serve as a full index, according to some embodiments of the present disclosure.

In some embodiments, the SuRF can be augmented to serve as a full index. FIG. 9 is a schematic diagram illustrating an example succinct range filter that is augmented to serve as a full index, according to some embodiments of the present disclosure. Although the succinct range filter is represented as a tree structure in FIG. 9, it is appreciated that the succinct range filter can be stored in a LOUDS structure (e.g., LOUDS structure of FIG. 2). It is appreciated that the augmented SuRF illustrated in FIG. 9 can be incorporated by data storage system 100 of FIG. 8 or server 110 of FIG. 8.

As shown above, a full index can be a data structure that can map every key to its location in a storage media, and a SuRF can be a succinct trie map. As a result, the succinct trie map can be augmented by adding a storage location pointer to each value. As shown in FIG. 9, the top portion of the succinct trie map is similar to FIG. 5's truncated trie. One difference is that the succinct trie map shown in FIG. 9 adds both a hash value and a pointer to a location of a corresponding record in the sorted data run. In some embodiments, the hash value and the pointer can be other types of associative data structures. Although the succinct trie map may not contain the full key, the key can be verified by following the pointer and read the data record from the sorted data run.

It is appreciated that by following the pointer and read the data record from the sorted data run, the existence of the full key in the data tree can be verified. When a key "k" is queried in the augmented SuRF, eventually a value with a truncated key "k'" can be reached, and "k'≤k<k''" where "k'" and "k''" are adjacent truncated keys in the succinct trie. The corresponding data record can then be read. For example, as shown in FIG. 6, when a key "14" is queried, eventually a value "11" can be reached, and "11≤14<16" where "14" and "16" are adjacent truncated keys in the succinct trie. If it is determined that there is no match for the key "k" in the data record, there is no need to read the next record since keys in the next record are not smaller than "k''." At the same time, there is no need to read and check the previous record either, since keys in the previous record are not larger than "k'."

As a result, the SuRF in FIG. 9 can be augmented to become a full index. The filter and the index share the same trie for storing keys, saving valuable memory resources. Moreover, since the trie only needs to be queried once for both filtering and querying, computation for searching a separate index no longer needs to be executed, hence improving performance of querying the database.

In some embodiments, the hash values and location pointers in the succinct trie may still take up too much memory. For example, a key hash value can be 8 bits in length, and a location pointer can be 64 bits in length. In a database system storing a massive amount of data, memory needed for storing the hash values and location pointers can add up, causing a drastic increase in SuRF's memory footprint.

To further improve memory efficiency, it can be desirable to keep separate data structures for the filter and the index, so that they can be loaded into memory separately on demand. This is advantageous because in many LSM-Tree based storage systems, the filter is first consulted. The index is queried only after the filter test is successful. Therefore, the index can be loaded into memory separately only when the filter test returns a positive result.

To keep two data structures for the filter and the index, two separate value sequences of the same size can be used in the succinct trie. The first value sequence can store the hash values (e.g., hash values sequence of FIG. 5, which can be similar to the "values" sequence in FIG. 2). The second value sequence can store storage location pointers.

Similar to FIG. 2, the succinct trie comprises four sequences: "labels," "hasChild," "louds," and "values." The rank operation and the select operation can be used to traverse the trie. When a position of the valid key is reached, operation ValuePos (pos) can be used to locate the position of the valid key's associated value in the "Values" sequence (e.g., formula (5)). The trie map can then retrieve the value using the position in the values sequence. An extra "values" sequence can be constructed to store storage location pointers.

Figure 10:
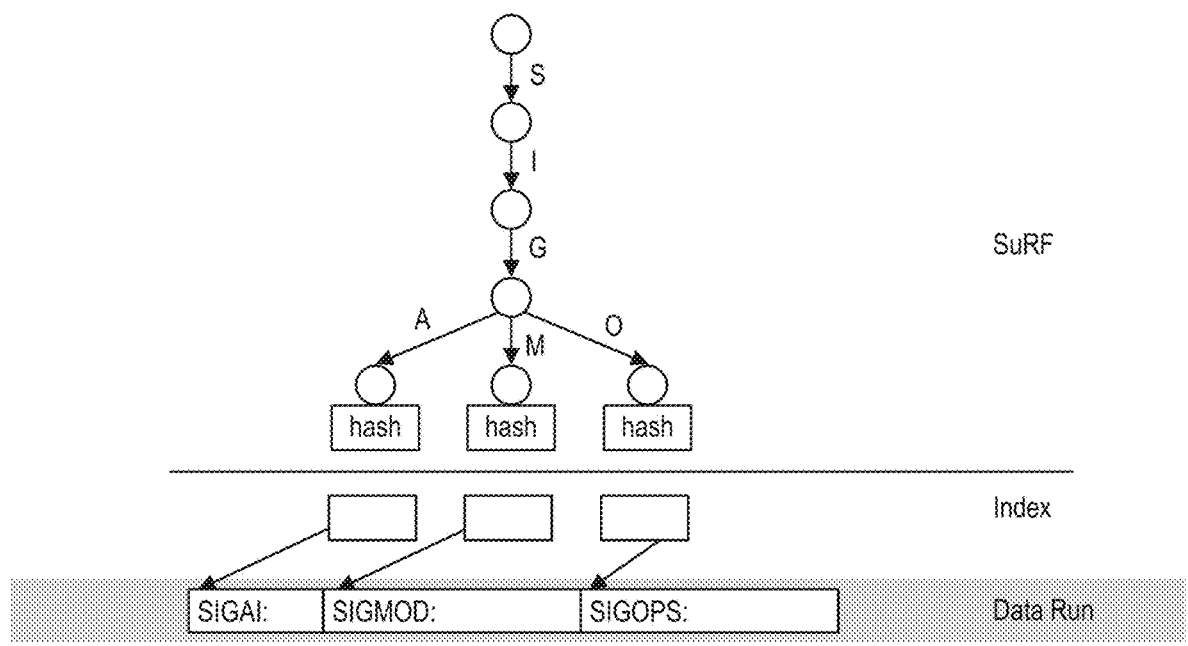
FIG. 10 is a schematic diagram of an example succinct trie structure with two values sequences, according to some embodiments of the present disclosure.

FIG. 10 is a schematic diagram of an example succinct trie structure with two values sequences, according to some embodiments of the present disclosure. As shown in FIG. 10, the top portion of the succinct trie is a SuRF that is similar to the SuRF shown in FIG. 5. At the same time, the succinct trie of FIG. 10 comprises an extra "index" sequence, which represents a second values sequence. In some embodiments, the "index" sequence can be stored or retrieved separately from SuRF's "hash values" sequence. In some embodiments, the "index" sequence can be the same size as the "hash values" sequence in the SuRF that comprises key hash values. Although the succinct range filter is represented as a tree structure in FIG. 10, it is appreciated that the succinct range filter can be stored in a LOUDS structure (e.g., LOUDS structure of FIG. 2).

When the SuRF is queried with a query key, the SuRF may return a positive result, indicating that the key may be present in the data run. Using the algorithm shown in FIG. 4's pseudocode, a position in the "hash values" sequence that corresponds to the query key can be returned. It is appreciated that the entry at the position in the "hash values" sequence may correspond to only a prefix of the query key.

This position can then be used in the "index" sequence to locate a storage location pointer. For example, as shown in FIG. 10, each pointer in the "index sequence" points to a data run where the first entry in the data run corresponds to a first key having the prefix along the path. In some embodiments, each data run can be sorted. After the SuRF returns a positive result that the query key may be present in the database, the sorted data run that may contain the entry corresponding to the query key can be searched to determine whether the query key is valid in the database. In some embodiments, the entry in the data run that corresponds to a valid query key can also be loaded or returned as a result to the query. Therefore, with the help of the SuRF, a single sequence of storage location pointers can serve as a full index without storing any keys.

Figure 11:
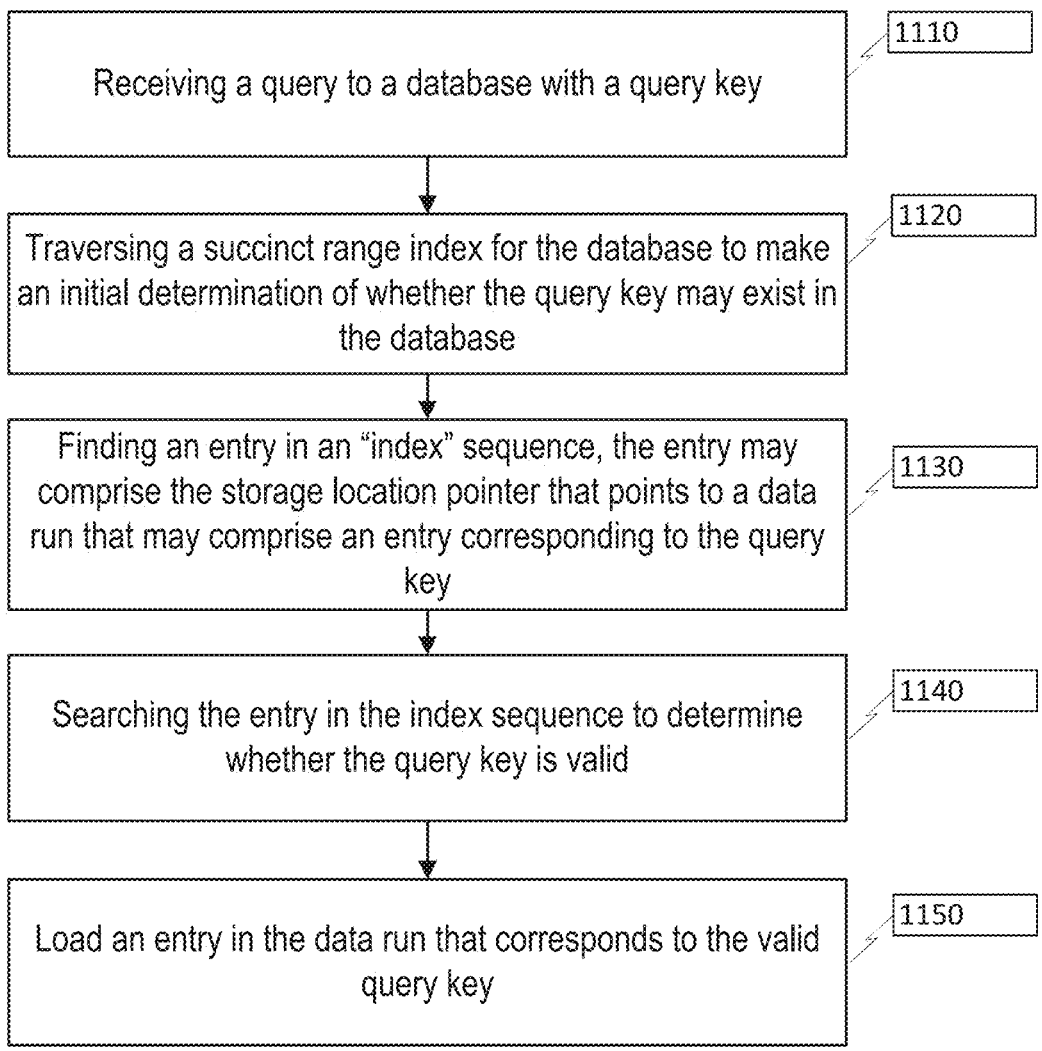
FIG. 11 illustrates a flow diagram of an example method 1100 for executing a database query using a succinct range filter with a full index, according to some embodiments of the present disclosure.

Embodiments of the present disclosure further provides a method for executing a database query using a SuRF with a full index. FIG. 11 illustrates a flow diagram of an example method 1100 for executing a database query using a succinct range filter with a full index, according to some embodiments of the present disclosure. It is appreciated that method 1100 can be performed on a succinct trie structure similar to the one shown in FIG. 10. It is also appreciated that method 1100 can be performed by a data storage system (e.g., data storage system 100 of FIG. 8) or by one or more servers (e.g., example server 110 of FIG. 8).

In step 1110, a query is received with a query key. In some embodiments, the query key can be a string, similar to the keys shown in FIG. 10. It is appreciated that labels in the query key can be any byte values, similar to the keys shown in FIG. 1.

In step 1120, a SuRF is traversed to make an initial determination of whether the query key may exist in the database. In some embodiments, the initial determination is made by finding a location of an entry in SuRF's "hash values" sequence, where the entry corresponds to the query key. For example, as shown in FIG. 10, a query for a key "SIGAI" can return a positive result from the hash key in the SuRF. In some embodiments, the initial determination can be executed using the algorithm from the pseudocode in FIG. 4.

In step 1130, if the initial determination in step 1120 returns a positive result that the query key may exist in the database, an "index" sequence is consulted to find an entry that may contain a storage location pointer that points to a data run that may contain a data entry corresponding to the query key. In some embodiments, the entries in the "index" sequence corresponds to the same prefix as the entries in the hash values sequences. As a result, the entry can be retrieved from the "index" sequence based on the location of the entry in SuRF's hash value index that corresponds to the query key. For example, as shown in FIG. 10, when the initial determination returns a positive result that query key "SIGAI" may exist in the database, the location of the hash value that corresponds to the prefix "SIGA" can be determined. This location can then be used in the "index" sequence to retrieve the entry that may contain a storage location pointer that points to the data run that starts with an entry corresponding to the key "SIGAI."

In some embodiments, after step 1130, step 1140 can be executed to search the entry in the "index" sequence to find the storage location pointer corresponding to the query key to determine whether the query key is valid in the database. For example, As shown in FIG. 10, the entry in the "index" sequence corresponding to "SIGA" can comprise multiple storage location pointers that share the prefix "SIGA." If a storage location pointer corresponding to "SIGAI" can be found in the entry, then this storage location pointer can be selected, and it can be determined that the query key is valid in the database, and the search for the query key "SIGAI" can return a positive result.

In some embodiments, after step 1140, step 1150 can be executed to load the data run that corresponds to the valid query key using the storage location pointer. In some embodiments, this step can complete the query by providing the system with the data entry corresponding to the query key.

In some embodiments, the SuRF can also be augmented to support a block index. A block index can save memory by comprising a smaller portion of the keys and their associated position pointers. This can be achieved by dividing a sorted data run into data blocks. Each data block can contain multiple data entries (e.g., key-value pairs). The first key in each data block can be used as the data block's block pointer, similar to the B+ tree shown in FIG. 6.

Figure 12:
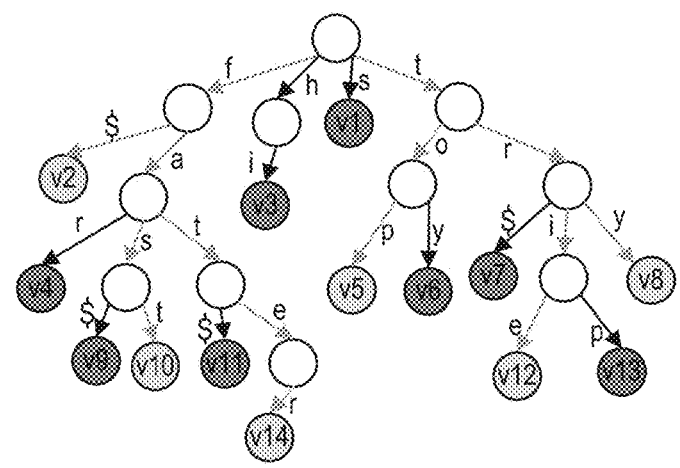
FIG. 12 illustrates a schematic diagram of an example succinct trie structure supporting a block index, according to some embodiments of the present disclosure.

FIG. 12 illustrates a schematic diagram of an example succinct trie structure supporting a block index, according to some embodiments of the present disclosure. As shown in FIG. 12, the succinct trie structure comprises a SuRF (e.g., succinct trie of FIG. 2). As a SuRF, each element of the "values" sequence in the succinct trie is a hash value of the key. To implement a block index on top of the succinct trie, first keys in the corresponding data blocks can be indicated. For illustrative purposes, these keys are colored in light grey in FIG. 12. All paths (e.g., edges) leading to these value nodes are colored in light grey too. Three additional bit sequences can be used, namely "BF," "BP," and "PTR."

The "BF" sequence is a bit sequence where a value of 1 represents that the corresponding label is on a path colored in light grey. In other words, "BF[pos]" means "label[pos]" is on a path to a key that is the first in its block. For example, as shown in FIG. 12, the value for key "fast" is colored in light grey. As a result, the "BF" sequence for the labels in the key "fast" all reads value 1.

The "BP" sequence is a bit sequence where a value of 1 represents that the corresponding label points to a light grey value node. In some embodiments, values in the "BP" sequence can be calculated as follows:

$$BP[pos]=!hasChild[pos] \text{ \&\& } BF[pos] \quad (5)$$

where "&&" represents an "and" function and "!" represents a "not" function. In some embodiments, the "BP" sequence is not stored physically, since the values in the "BP" sequence can be derived from the "hasChild" sequence and the "BF" sequence. By not storing the "BP" sequence physically, more memory savings can be achieved.

The "PTR" sequence is a sequence of block pointers that correspond to labels where the value of the corresponding "BP" sequence reads 1.

Next, two more operations can be established to help with the block index. A PtrPos (pos) operation can count the number of value "1" up to position pos in the "BP" sequence. A BlockPointer (pos) operation can return the position of the block pointer in which the label represented by pos resides:

$$PtrPos (pos) = rank_1(BP,pos)-1; \quad (6)$$

BlockPointer (pos)=NULL, if $BP[pos]==0$, and $$BlockPointer (pos)=PTR[PtrPos(pos)], \text{ if } BP[pos]==1. \quad (7)$$

In some embodiments, the algorithm shown in FIG. 4's pseudocode can be further used and improved to support block index in SuRF. FIG. 13 illustrates an example pseudocode for querying a key in a succinct trie structure supporting a block index, according to some embodiments of the present disclosure. It is appreciated that the algorithm shown in FIG. 13's pseudocode can be performed on a succinct trie structure similar to the one shown in FIG. 10. It is also appreciated that the algorithm shown in FIG. 13's pseudocode can be performed by a data storage system (e.g., data storage system 100 of FIG. 8) or by one or more servers (e.g., example server 110 of FIG. 8).

As shown in FIG. 13, function "findBlock" takes as input a variable "iter" of a data type "LoudsIteration" (e.g., data type "LoudsIteration" shown in FIG. 3) that comprises a path of locations in the "hash values" sequence that arrives at a hash value corresponding to the query key, and outputs a "BlockPointer" data structure that comprises a pointer to a data block that corresponds to the path defined by the variable "iter."

The algorithm first checks if the path in the variable "iter" is a first node in a data block (e.g., the path in the variable "iter" points to a light grey value node by itself). If the determination returns a positive result, the algorithm returns the pointer in the "PTR" sequence located at a location equivalent to the end of the path. In some embodiments, the end location can be represented as iter.positions[iter.length]. For example, as shown in FIG. 12, the path for a key "fast" points value "v10," which is a light grey node indicating that the key "fast" is already a first key in a data block. The pointer located at the same location indicated by a path followed by key "fast" can be returned directly. In this example, the pointer for the key "fast" is "P04."

Next, the algorithm traces the path, and finds a first location where the path is no longer along a path that points to a first value in a data block (e.g., the path is no longer light grey). In some embodiments, the value in the "BF" sequence is checked, and the first "BF" value of 0 in the path is indicated. For example, as shown in FIG. 12, the path for a key "trip" points to value "v13," which is not a light grey node. Following the path, the first time that the path no longer follows light grey edge is at label "p," since the "BF" value for label "p" is 0.

After the algorithm determines the first edge along the path where the "BP" value is 0, indicating that the edge is no longer light grey, the algorithm tries to find a sibling child node of the first edge to determine if the sibling child node has a BP value of 1 (e.g., the sibling child node is light grey). For example, as shown in FIG. 12, the node represented by label "p" in the key "trip" has a sibling child node that is represented by a key "trie," which points to value "v12," a light grey node. If the algorithm can find a sibling child node that is light grey, the sibling child node can be determined to be the first key in the data block that comprises data associated with the key "trip." As a result, pointer "P05" can be used to retrieve the data block that comprises data associated with the key "trip."

If the algorithm cannot find a sibling child node wherein the "BP" value is 1 (e.g., a sibling child node that is light grey), the algorithm can trace upwards along the path and continue to search for sibling child node. For example, as shown in FIG. 12, if value "v12" is not a light grey node, the algorithm can trace upwards along the path defined by the key "trip" until the label "r." The label "r" has a sibling child node represented by label "o," which has a child node represented by label "p." The child node represented by label "p" points to value "v5," which is a light grey node. As a result, pointer "P02" can be used to retrieve the data block that comprises data associated with the key "trip."

The various example embodiments described herein are described in the general context of method steps or processes, which may be implemented in one aspect by a computer program product, embodied in a computer-readable medium, including computer-executable instructions, such as program code, executed by computers in networked environments. In some embodiments, a data storage system (e.g., data storage system 100 of FIG. 8) may instruct components (e.g., physical storage 164 of FIG. 8) of computer system (e.g., server 110 of FIG. 8) to perform various functions described above, such as establishing categorizer algorithms, initiating and performing compaction processes, etc. A computer-readable medium may include removeable and nonremovable storage devices including, but not limited to, Read Only Memory (e.g., ROM 163 of FIG. 8), Random Access Memory (e.g., RAM 162 of FIG. 8), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the embodiments disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

The embodiments may further be described using the following clauses:

1. A method for executing a query in a database, the method comprising:
   receiving the query that comprises a query key;
   searching a data structure of the database to determine whether the query key includes a portion that corresponds to an entry in the database, wherein the data structure comprises a first sequence of values comprising information that indicates whether the database comprises data that corresponds to a portion of a key, and a second sequence of values comprising pointers pointing to data that corresponds to the key;
   in response to the query key including a portion that corresponds to an entry in the database, determining a location of a value in the first sequence, wherein the value corresponds to the portion of the query key; and
   determining a pointer in the second sequence of values according to the location, wherein the pointer points to data that corresponds to the query key.

2. The method according to clause 1, further comprising:
   retrieving a data run that the pointer points to; and
   retrieving, from the data run, data that correspond to the query key.

3. The method according to clauses 1 or 2, wherein the first sequence of values and the second sequence of values can be retrieved separately.

4. The method according to any one of clauses 1-3, wherein the data structure comprises a filter for the database, the filter comprising a succinct trie.

5. The method according to clause 4, wherein the first sequence of values comprises hash values.

6. The method according to clause 5, wherein:
   the succinct trie is organized according to shared prefixes of keys; and
   searching a filter of the database to determine whether the query key includes a prefix that corresponds to an entry in the database further comprising:
   searching the succinct trie by following a prefix of the query key;
   determining a hash value that corresponds to the prefix of the query key; and
   determining whether the prefix of the query key exists in the database according to the hash value.

7. The method according to any one of clauses 4-6, wherein the succinct trie comprises a Level-Orderd Unary Degree Sequence.

8. A data storage system for executing a query in a database, comprising:
   a memory storing a set of instructions; and
   a processor configured to execute the set of instructions to cause the data storage system to:
   receive the query that comprises a query key;
   search a data structure of the database to determine whether the query key includes a portion that corresponds to an entry in the database, wherein the data structure comprises a first sequence of values comprising information that indicates whether the database may comprise data that corresponds to a portion of a key, and a second sequence of values comprising pointers pointing to data that corresponds to the key;
   in response to the query key including a portion that corresponds to an entry in the database, determine a location of a value in the first sequence, wherein the value corresponds to the portion of the query key; and
   determine a pointer in the second sequence of values according to the location, wherein the pointer points to data that corresponds to the query key.

9. The data storage system according to clause 8, wherein the one or more processors are further configured to executed the set of instructions to cause the system to:
   retrieving a data run that the pointer points to; and
   retrieving, from the data run, data that correspond to the query key.

10. The data storage system according to clause 8 or 9, wherein the first sequence of values and the second sequence of values can be retrieved separately.

11. The data storage system according to any one of clauses 8-10, wherein the data structure comprises a filter for the database, the filter comprising a succinct trie.

12. The data storage system according to clause 11, wherein the first sequence of values comprises hash values.

13. The data storage system according to clause 12, wherein:
   the succinct trie is organized according to shared prefixes of keys; and
   the one or more processors are further configured to executed the set of instructions to cause the system to:
   search the succinct trie by following a prefix of the query key;
   determine a hash value that corresponds to the prefix of the query key; and
   determine whether the prefix of the query key exists in the database according to the hash value.

14. The data storage system according to any one of clauses 11-13, wherein the succinct trie comprises a Level-Orderd Unary Degree Sequence.

15. A non-transitory computer readable medium that stores a set of instructions that is executable by one or more processors of an apparatus to cause the apparatus to initiate a method for executing a query in a database, the method comprising:

receiving the query that comprises a query key;

searching a data structure of the database to determine whether the query key includes a portion that corresponds to an entry in the database, wherein the data structure comprises a first sequence of values comprising information that indicates whether the database comprises data that corresponds to a portion of a key, and a second sequence of values comprising pointers pointing to data that corresponds to the key;

in response to the query key including a portion that corresponds to an entry in the database, determining a location of a value in the first sequence, wherein the value corresponds to the portion of the query key; and determining a pointer in the second sequence of values according to the location, wherein the pointer points to data that corresponds to the query key.

16. The non-transitory computer readable medium according to clause 15, wherein the method further comprising:

retrieving a data run that the pointer points to; and retrieving, from the data run, data that correspond to the query key.

17. The non-transitory computer readable medium according to clause 15 or 16, wherein the first sequence of values and the second sequence of values can be retrieved separately.

18. The non-transitory computer readable medium according to any one of clauses 15-17, wherein the data structure comprises a filter of the database, the filter comprising a succinct trie.

19. The non-transitory computer readable medium according to clause 18, wherein the first sequence of values comprises hash values.

20. The non-transitory computer readable medium according to clause 19, wherein:

the succinct trie is organized according to shared prefixes of keys; and the method further comprises:

searching the succinct trie by following a prefix of the query key;
determining a hash value that corresponds to the prefix of the query key; and
determining whether the prefix of the query key exists in the database according to the hash value.

21. The non-transitory computer readable medium according to any one of clauses 18-20, wherein the succinct trie comprises a Level-Orderd Unary Degree Sequence.

22. A method for executing a query in a database, the method comprising:

receiving the query that comprises a query key;

searching a data structure of the database to determine whether the query key includes a portion that corresponds to an entry in the database, wherein the data structure comprises a first sequence of values comprising information that indicates whether the database comprises data that corresponds to a portion of a key, a second sequence of values comprising information that indicates whether a key in the database is a first key in a data block, and a third sequence of values comprising pointers pointing to a data block that comprises data corresponding to the key;

in response to the query key including a portion that corresponds to an entry in the database, determining a location of a value in the first sequence, wherein the value corresponds to the portion of the query key;

determining a location of a value in the second sequence according to the location in the first sequence, wherein the value in the second sequence indicates a first key in a data block that comprises data corresponding to the query key; and determining a pointer in the third sequence of values according to the location in the second sequence, wherein the pointer points to the data block.

23. The method according to clause 22, further comprising:

retrieving a data block that the pointer points to; and retrieving, from the data block, data that correspond to the query key.

24. The method according to clause 22 or 23, wherein the first sequence of values, the second sequence of values, and the third sequence of values can be retrieved separately.

25. The method according to any one of clauses 22-24, wherein the data structure comprises a filter of the database, the filter comprising succinct trie that is organized according to shared prefixes of keys.

26. The method according to clause 25, wherein the first sequence of values comprises hash values.

27. The method according to clause 26, wherein searching a data structure of the database to determine whether the query key includes a prefix that corresponds to an entry in the database further comprising:

searching the succinct trie by following a prefix of the query key;

determining a hash value that corresponds to the prefix of the query key; and determining whether the query key exists in the database according to the hash value.

28. The method according to any one of clauses 25-27, wherein the succinct trie comprises a Level-Orderd Unary Degree Sequence.

29. The method according to any one of clauses 25-28, wherein determining a location of a value in the second sequence according to the location in the first sequence further comprising:

tracing the succinct trie along a path corresponding to a prefix of the query key, wherein the path is determined using the location in the first sequence;

determining a location in the second sequence, wherein the location in the second sequence indicates that the path is no longer pointing to a first key in a data block; and according to the location in the second sequence indicating that the path is no longer pointing to a first key in a data block, determining a location of a value in the second sequence, wherein the value in the second sequence indicates a first key in a data block that comprises data corresponding to the query key.

30. A data storage system for executing a query in a database, comprising:

a memory storing a set of instructions; and a processor configured to execute the set of instructions to cause the data storage system to:

receive the query that comprises a query key;

search a data structure of the database to determine whether the query key includes a portion that corresponds to an entry in the database, wherein the data structure comprises a first sequence of values comprising information that indicates whether the database comprises data that corresponds to a portion of a key, a second sequence of values comprising information that indicates whether a key in the database is a first key in a data block, and a third sequence of values comprising pointers pointing to a data block that comprises data corresponding to the key;

in response to the query key existing in the database, determine a location of a value in the first sequence, wherein the value corresponds to the portion of the query key;

determine a location of a value in the second sequence according to the location in the first sequence, wherein the value in the second sequence indicates a first key in a data block that comprises data corresponding to the query key; and determine a pointer in the third sequence of values according to the location in the second sequence, wherein the pointer points to the data block.

31. The data storage system according to clause 30, the one or more processors are further configured to executed the set of instructions to cause the system to:

retrieve a data block that the pointer points to; and retrieve, from the data block, data that correspond to the query key.

32. The data storage system according to clause 30 or 31, wherein the first sequence of values, the second sequence of values, and the third sequence of values can be retrieved separately.

33. The data storage system according to any one of clauses 30-32, wherein the data structure comprises a filter of the database, the filter comprising a succinct trie that is organized according to shared prefixes of keys.

34. The data storage system according to clause 33, wherein the first sequence of values comprises hash values.

35. The data storage system according to clause 33 or 34, wherein searching a data structure of the database to determine whether the query key includes a prefix corresponding to an entry in the database further comprising:

searching the succinct trie by following a prefix of a query key;

determining a hash value that corresponds to the prefix of the query key; and determining whether the prefix of the query key exists in the database according to a hash value.

36. The data storage system according to any one of clauses 33-35, wherein the succinct trie comprises a Level-Orderd Unary Degree Sequence.

37. The data storage system according to any one of clause 33-36, wherein determining a location of a value in the second sequence according to the location in the first sequence further comprising:

tracing the succinct trie along a path corresponding to a prefix of the query key, wherein the path is determined using the location in the first sequence;

determining a location in the second sequence, wherein the location in the second sequence indicates that the path is no longer pointing to a first key in a data block; and according to the location in the second sequence indicating that the path is no longer pointing to a first key in a data block, determining a location of a value in the second sequence, wherein the value in the second sequence indicates a first key in a data block that comprises data corresponding to the query key.

38. A non-transitory computer readable medium that stores a set of instructions that is executable by one or more processors of an apparatus to cause the apparatus to initiate a method for executing a query in a database, the method comprising:

receiving the query that comprises a query key;

searching a data structure of the database to determine whether the query key includes a portion that corresponds to an entry in the database, wherein the data structure comprises a first sequence of values comprising information that indicates whether the database comprises data that corresponds to a portion of a key, a second sequence of values comprising information that indicates whether a key in the database is a first key in a data block, and a third sequence of values comprising pointers pointing to a data block that comprises data corresponding to the key;

in response to the query key existing in the database, determining a location of a value in the first sequence, wherein the value corresponds to the query key;

determining a location of a value in the second sequence according to the location in the first sequence, wherein the value in the second sequence indicates a first key in a data block that comprises data corresponding to the query key; and determining a pointer in the third sequence of values according to the location in the second sequence, wherein the pointer points to the data block.

39. The non-transitory computer readable medium according to clause 38, wherein the method further comprising:

retrieving a data block that the pointer points to; and retrieving, from the data block, data that correspond to the query key.

40. The non-transitory computer readable medium according to clause 38 or 39, wherein the first sequence of values, the second sequence of values, and the third sequence of values can be retrieved separately.

41. The non-transitory computer readable medium according to any one of clauses 38-40, wherein the data structure comprises a filter, the filter comprising a succinct trie that is organized according to shared prefixes of keys.

42. The non-transitory computer readable medium according to clause 41, wherein the first sequence of values comprises hash values.

43. The non-transitory computer readable medium according to clause 42, wherein searching a data structure of the database to determine whether the query key includes a prefix corresponding to an entry in the database further comprising:

searching the succinct trie by following a prefix of the query key;

determining a hash value that corresponds to the prefix of the query key; and determining whether the prefix of the query key exists in the database according to a hash value.

44. The non-transitory computer readable medium according to clause 42 or 43, wherein the succinct trie comprises a Level-Orderd Unary Degree Sequence.

45. The non-transitory computer readable medium according to any one of clauses 42-44, wherein determining a location of a value in the second sequence according to the location in the first sequence further comprising:

tracing the succinct trie along a path corresponding to a prefix of the query key, wherein the path is determined using the location in the first sequence;

determining a location in the second sequence, wherein the location in the second sequence indicates that the path is no longer pointing to a first key in a data block; and according to the location in the second sequence indicating that the path is no longer pointing to a first key in a data block, determining a location of a value in the second sequence, wherein the value in the second sequence indicates a first key in a data block that comprises data corresponding to the query key.

46. A data structure in a database, the data structure comprising:
 a first sequence of values comprising information that indicates labels of keys in a trie of the database;
 a second sequence of values comprising information that indicates whether the labels in the first sequence have one or more child nodes;
 a third sequence of values comprising information that indicates whether the labels in the first sequence are first child nodes under a parent node;
 a sequence of associative data structures comprising:
  information that indicates whether a key associated with the labels in the first sequence exists in the database, and
  a pointer indicating a location of a data record that corresponds to the key.

In the drawings and specification, there have been disclosed exemplary embodiments. Many variations and modifications, however, can be made to these embodiments. Accordingly, although specific terms are employed, they are used in a generic and descriptive sense only and not for purposes of limitation, the scope of the embodiments being defined by the following claims.

What is claimed is:

1. A method for executing a query in a database, the method comprising:
 receiving the query that comprises a query key;
 searching a data structure of the database to determine whether the query key includes a portion that corresponds to an entry in the database, wherein the data structure comprises a first sequence of values comprising information that indicates whether the database comprises data that corresponds to a portion of a key, and a second sequence of values comprising pointers pointing to data that corresponds to the key;
 in response to determining the query key including a portion that corresponds to an entry in the first sequence of values of the database, determining a location of a value in the first sequence, wherein the value corresponds to the portion of the query key; and
 determining a pointer in the second sequence of values according to the location, wherein the pointer points to data that corresponds to the query key.

2. The method according to claim 1, further comprising:
 retrieving a data run that the pointer points to; and
 retrieving, from the data run, data that correspond to the query key.

3. The method according to claim 1, wherein the first sequence of values and the second sequence of values can be retrieved separately.

4. The method according to claim 1, wherein the data structure comprises a filter for the database, the filter comprising a succinct trie.

5. The method according to claim 4, wherein the first sequence of values comprises hash values.

6. The method according to claim 5, wherein:
 the succinct trie is organized according to shared prefixes of keys; and
 searching a filter of the database to determine whether the query key includes a prefix that corresponds to an entry in the database further comprising:
  searching the succinct trie by following a prefix of the query key;
  determining a hash value that corresponds to the prefix of the query key; and
  determining whether the prefix of the query key exists in the database according to the hash value.

7. The method according to claim 4, wherein the succinct trie comprises a Level-Orderd Unary Degree Sequence.

8. A data storage system for executing a query in a database, comprising:
 a memory storing a set of instructions; and
 a processor configured to execute the set of instructions to cause the data storage system to:
  receive the query that comprises a query key;
  search a data structure of the database to determine whether the query key includes a portion that corresponds to an entry in the database, wherein the data structure comprises a first sequence of values comprising information that indicates whether the database may comprise data that corresponds to a portion of a key, and a second sequence of values comprising pointers pointing to data that corresponds to the key;
  in response to determining the query key including a portion that corresponds to an entry in the first sequence of values of the database, determine a location of a value in the first sequence, wherein the value corresponds to the portion of the query key; and
  determine a pointer in the second sequence of values according to the location, wherein the pointer points to data that corresponds to the query key.

9. The data storage system according to claim 8, wherein the one or more processors are further configured to executed the set of instructions to cause the system to:
 retrieving a data run that the pointer points to; and
 retrieving, from the data run, data that correspond to the query key.

10. The data storage system according to claim 8, wherein the first sequence of values and the second sequence of values can be retrieved separately.

11. The data storage system according to claim 8, wherein the data structure comprises a filter for the database, the filter comprising a succinct trie.

12. The data storage system according to claim 11, wherein the first sequence of values comprises hash values.

13. The data storage system according to claim 12, wherein:
 the succinct trie is organized according to shared prefixes of keys; and
 the one or more processors are further configured to executed the set of instructions to cause the system to:
  search the succinct trie by following a prefix of the query key;
  determine a hash value that corresponds to the prefix of the query key; and
  determine whether the prefix of the query key exists in the database according to the hash value.

14. The data storage system according to claim 11, wherein the succinct trie comprises a Level-Orderd Unary Degree Sequence.

15. A non-transitory computer readable medium that stores a set of instructions that is executable by one or more processors of an apparatus to cause the apparatus to initiate a method for executing a query in a database, the method comprising:
 receiving the query that comprises a query key;
 searching a data structure of the database to determine whether the query key includes a portion that corresponds to an entry in the database, wherein the data structure comprises a first sequence of values comprising information that indicates whether the database comprises data that corresponds to a portion of a key, and a second sequence of values comprising pointers pointing to data that corresponds to the key;

in response to determining the query key including a portion that corresponds to an entry in the first sequence of values of the database, determining a location of a value in the first sequence, wherein the value corresponds to the portion of the query key; and determining a pointer in the second sequence of values according to the location, wherein the pointer points to data that corresponds to the query key.

16. The non-transitory computer readable medium according to claim 15, wherein the method further comprising:

retrieving a data run that the pointer points to; and retrieving, from the data run, data that correspond to the query key.

17. The non-transitory computer readable medium according to claim 15, wherein the first sequence of values and the second sequence of values can be retrieved separately.

18. The non-transitory computer readable medium according to claim 15, wherein:

the data structure comprises a filter of the database, the filter comprising a succinct trie;

the first sequence of values comprises hash values;

the succinct trie is organized according to shared prefixes of keys; and the method further comprises:

searching the succinct trie by following a prefix of the query key; determining a hash value that corresponds to the prefix of the query key; and determining whether the prefix of the query key exists in the database according to the hash value.

19. The non-transitory computer readable medium according to claim 18, wherein the succinct trie comprises a Level-Orderd Unary Degree Sequence.

* * * * *